(12) United States Patent
Ciliske et al.

(10) Patent No.: US 7,707,963 B2
(45) Date of Patent: May 4, 2010

(54) SYSTEM FOR FORMING MULTI-LAYER FILMS USING CORONA TREATMENTS

(75) Inventors: Scott L. Ciliske, St. Paul, MN (US); Gregory F. King, Minneapolis, MN (US); Mark A. Strobel, Maplewood, MN (US); Joel A. Getschel, Osceola, WI (US); Bert T. Chien, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 133 days.

(21) Appl. No.: 11/394,868

(22) Filed: Mar. 31, 2006

(65) Prior Publication Data

US 2007/0234954 A1 Oct. 11, 2007

(51) Int. Cl.
*B05C 5/02* (2006.01)

(52) U.S. Cl. ................................. 118/621; 118/DIG. 2

(58) Field of Classification Search ............ 118/DIG. 4, 118/DIG. 2, 620, 621, 641, 634, 623, 50, 118/410, 325; 427/532–540, 460, 508, 512
See application file for complete search history.

(56) References Cited

U.S. PATENT DOCUMENTS

| | | | | |
|---|---|---|---|---|
| 3,303,816 A | * | 2/1967 | Lauring | 118/603 |
| 3,811,913 A | * | 5/1974 | Kasugai et al. | 428/476.6 |
| 4,287,240 A | * | 9/1981 | O'Connor | 427/402 |
| 4,791,004 A | * | 12/1988 | Suzuki et al. | 427/541 |
| 4,844,979 A | | 7/1989 | Strobel et al. | |
| 4,876,139 A | | 10/1989 | Yamamoto et al. | |
| 4,929,319 A | * | 5/1990 | Dinter et al. | 204/164 |
| 5,108,780 A | | 4/1992 | Pitt et al. | |
| 5,244,780 A | | 9/1993 | Strobel et al. | |
| 5,271,970 A | * | 12/1993 | Gribbin et al. | 427/569 |
| 5,340,616 A | * | 8/1994 | Amano et al. | 427/458 |
| 5,348,772 A | | 9/1994 | Demuth et al. | |
| 5,662,972 A | | 9/1997 | Shimada et al. | |
| 5,976,630 A | * | 11/1999 | Korokeyi et al. | 427/420 |
| 6,106,659 A | | 8/2000 | Spence et al. | |
| 6,117,237 A | * | 9/2000 | Yapel et al. | 118/410 |
| 6,896,936 B2 | * | 5/2005 | Neuhaus-Steinmetz et al. | 427/482 |
| 7,329,465 B2 | | 2/2008 | Chien et al. | |

(Continued)

FOREIGN PATENT DOCUMENTS

JP 07-053745 2/1995

(Continued)

OTHER PUBLICATIONS

Robert C. Weast, editor, Handbook of Chemistry and Physics, 56th edition, CRC Press Inc., Cleveland, OH (1975), p. F-206.

(Continued)

*Primary Examiner*—Brenda A Lamb
(74) *Attorney, Agent, or Firm*—Jay R. Pralle (57) ABSTRACT

A system for forming a multi-layer film, where the system includes a backing support having a surface and a close-coupled unit configured to be disposed adjacent the surface of the backing support. The close-coupled unit includes a corona electrode and a coating die disposed at a downstream location along the surface from the corona electrode.

15 Claims, 4 Drawing Sheets

U.S. PATENT DOCUMENTS

| | | |
|---|---|---|
| 7,348,066 B2 | 3/2008 | Chien et al. |
| 2003/0207093 A1 | 11/2003 | Tsuji et al. |
| 2003/0232210 A1 | 12/2003 | Haas et al. |
| 2004/0112282 A1* | 6/2004 | Metzger et al. ............ 118/50 |
| 2004/0131895 A1 | 7/2004 | Hirata et al. |
| 2004/0155372 A1 | 8/2004 | Allen et al. |
| 2004/0231186 A1 | 11/2004 | Kolb et al. |
| 2006/0003178 A1 | 1/2006 | Strobel et al. |
| 2006/0012879 A1 | 1/2006 | Johnson et al. |
| 2006/0093846 A1 | 5/2006 | Chien et al. |
| 2008/0152837 A1 | 6/2008 | Chien et al. |

FOREIGN PATENT DOCUMENTS

| | | |
|---|---|---|
| JP | 10-138384 | 5/1998 |
| JP | 2003-211579 | 7/2003 |
| JP | 2003318594 | 11/2003 |
| WO | WO 9530539 | 11/1995 |
| WO | WO 99/18149 | 4/1999 |

OTHER PUBLICATIONS

G.G. Hawley, editor, The Condensed Chemical Dictionary, 10th edition., Van Nostrand Reinhold Co., (1981) p. 743.

* cited by examiner

SYSTEM FOR FORMING MULTI-LAYER FILMS USING CORONA TREATMENTS

CROSS-REFERENCE TO RELATED APPLICATION(S)

Reference is hereby made to co-pending patent application Ser. No. 11/395,901 filed on Mar. 31, 2006, entitled "Method of Forming Multi-Layer Films Using Corona Treatments".

BACKGROUND OF THE INVENTION

The present disclosure relates generally to systems for forming multi-layer films. In one particular exemplary embodiment, the present disclosure relates to systems for forming multi-layer films using corona treatments to increase interlayer adhesion.

Corona treatment of films is a cost-effective technique for modifying surface properties of the given films. The term "corona" as used herein refers to a process in which active gaseous species (e.g., free radicals, ions, and electrically or vibrationally excited states) are produced by electron impact with gaseous molecules. The term "corona" is also commonly referred to by other terms, such as corona discharge, barrier discharge, atmospheric-pressure dielectric-barrier discharge, atmospheric-pressure plasma, atmospheric-pressure glow discharge, atmospheric-pressure non-equilibrium plasma, silent discharge, atmospheric-pressure partially ionized gas, filamentary discharge, direct or remote atmospheric-pressure discharge, externally sustained or self-sustained atmospheric-pressure discharge, and the like.

During or after a corona treatment process, the corona-treated film is typically exposed to air prior to a subsequent coating process. The exposure to air, particularly oxygen, even for short durations, may reduce the surface properties of the film. This may reduce interlayer adhesion between the treated surface and a subsequent coating. One common technique for removing air during a corona-treatment process involves generating a vacuum and operating at pressures below standard atmospheric pressure. However, vacuum processes commonly have high operating and capital costs, and typically require the treated film to be removed from the vacuum environment prior to subsequent coating processes. As such, there is an ongoing need for efficient systems for forming multi-layer films with corona treatments that minimize exposure of the energized surfaces to oxygen-containing environments prior to subsequent coating processes.

BRIEF SUMMARY OF THE INVENTION

The present disclosure involves a system for forming a multi-layer film. The system includes a backing support having a surface and a close-coupled unit configured to be disposed adjacent the surface of the backing support. The close-coupled unit includes a corona electrode and a coating die disposed at a downstream location along the surface from the corona electrode.

Unless otherwise explicitly stated, the following definitions apply herein:

The term "corona treatment" refers to a process of using a corona to impart a change in surface properties.

The term "downstream" when used with respect to moving films or an apparatus for coating such moving films, refers to a location that is offset in the direction of the film motion.

The term "upstream" when used with respect to moving films or an apparatus for coating such moving films, refers to a location that is offset in the direction opposite of the film motion.

While the above-identified drawing figures set forth several embodiments of the disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the disclosure. The figures may not be drawn to scale. Like reference numbers have been used throughout the figures to denote like parts.

DETAILED DESCRIPTION

Figure 1:
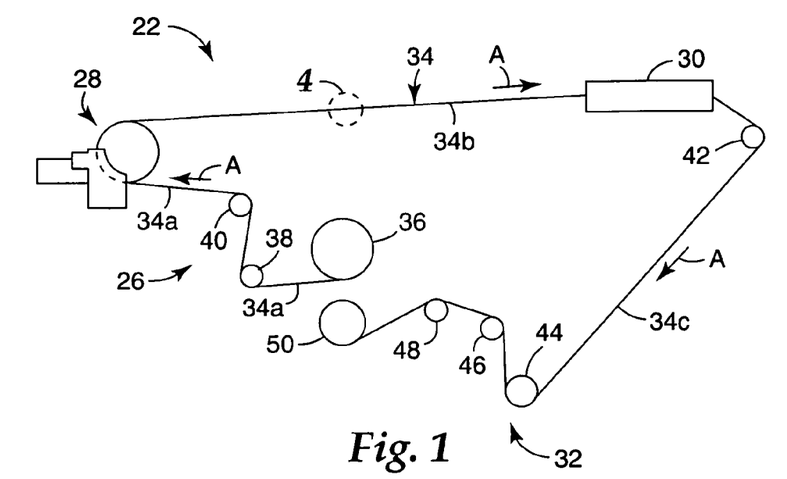
FIG. 1 is a side schematic illustration of an exemplary system for forming multi-layer films.

FIG. 1 is a side schematic illustration of system 22, which is a suitable system for forming multi-layer films having good interlayer adhesion. System 22 preserves interlayer adhesions by reducing exposure of corona-treated films to high oxygen concentrations (e.g., air). System 22 includes unwinder portion 26, corona-treatment and coating (CTC) assembly 28, solidification station 30, and winder portion 32, which provide a sequential pathway (represented by arrows A) for web 34. Unwinder portion 26 includes unwind shaft/supply roll 36 and rollers 38 and 40, which provide an uncoated substrate to CTC assembly 28. Correspondingly, retrieval portion 32 includes rollers 42, 44, 46, and 48, and winder shaft/core 50, which receive and wind resulting coated substrate from solidification station 30. System 22 may alternatively include additional or fewer rollers than shown in FIG. 2 depending on the particular arrangements used.

Web 34 includes substrate 34a, coated substrate 34b, and multi-layer film 34c. Substrate 34a is located at unwinder portion 26 of system 22, and may be any type of film that is suitable for corona-treatment processes. In some exemplary embodiments, substrate 34a can be a reflective film, reflective polarizing film (such as but not limited to a multilayer reflective polarizer or a diffusely reflective polarizer), a retarder, a diffuser, a combination thereof, or any other suitable film onto which a layer of solidifiable material may be coated. Coated substrate 34b is disposed between CTC assembly 28 and solidification station 30, and includes substrate 34a coated with a solidifiable coating material. Multi-layer film 34c is located at winder portion 32, and includes a solidified coating adhered to substrate 34a.

As discussed below, CTC assembly 28 is the portion of system 22 where substrate 34a is corona treated and coated with a coating material within a processing environment to produce coated substrate 34b. The coating material may be any type of material that is coatable onto substrate 34a. In one embodiment, the coating material is a solidifiable material, which is coatable in a flowable or semi-flowable state, and which may be subsequently solidified. Examples of suitable solidifiable materials include curable materials (e.g., photocurable, chemically curable, and thermosetting materials), thermoplastic materials, emulsions, and solvent-borne materials. Because substrate 34a remains within the processing environment between the corona treatment and the coating process step, the corona-treated surface of substrate 34a is not exposed to gases having high oxygen concentrations (e.g., air). This substantially prevents oxygen from contacting the corona-treated surface, thereby preserving the adhesive properties obtained from the corona treatment.

Upon exiting CTC assembly 28, coated substrate 34b travels to solidification station 30. Solidification station 30 is an apparatus for solidifying the coating material, and may vary in design and function based on the chemistry of the coating material. For embodiments involving photocurable materials, solidification station 30 may be a radiation source that provides photoinitiating radiation. An example of a suitable commercially available radiation source is a trade designated "F450" D-bulb ultraviolet curing system from Fusion UV Systems, Inc., Gaithersburg, Md. Alternatively, for thermosetting materials and solvent-borne materials, solidification station 30 may be a heat source, such as a convection oven or heat induction system. In embodiments involving thermoplastic materials, solidification station 30 may be a coolant source, such as a heat exchanger, which cools the materials below the respective solidification temperatures. In additional embodiments, solidification state 30 may incorporate a combination of solidification techniques. For example, solidification station 30 may sequentially dry and cure solvent-borne photocurable materials.

Prior to or concurrently with solidification, the layer of coating material may also be conditioned, such as roughening, texturing, structuring, and combinations thereof. In some exemplary embodiments, a rough or textured surface may be thereby produced for increased diffusion of light. In other exemplary embodiments, a structured surface may be thereby produced. Those of ordinary skill in the art will readily appreciate that any types of surface structures may be imparted into the layer of coating material. Exemplary surface structures include linear parallel prisms grooves, concave or convex pyramidal structures, concave or concave or convex lenticular structures, or any other surface structures suitable for a particular application.

Upon exiting solidification station 30, the solidified coating is adhered to the corona-treated surface of substrate 34a, thereby providing multi-layer film 34c. System 22 allows multi-layer film 34c to be formed in a continuous process with a variety of web speeds. Examples of suitable web speeds range from about 1 meter/minute (m/min) to about 35 m/min, with particularly suitable web speeds ranging from about 5 m/min to about 10 m/min.

During operation, substrate 34a is fed at a selected web speed to CTC assembly 28. Within CTC assembly 28, substrate 34a is corona treated and coated with a coating material within a processing environment that has a positive pressure and a low oxygen concentration (or is free of oxygen). The resulting coated substrate 34b then travels to solidification station 30. Because the coating material is coated on the corona-treated surface of substrate 34a, oxygen from the air in the external environment is prevented from directly contacting the corona-treated surface, and does not have time to contact the corona-treated surface by diffusion through the coating material. Therefore, the surface properties of the corona-treated surface are substantially preserved. The coating material is solidified in solidification station 30, which further increases the adhesion to the corona-treated surface of substrate 34a, thereby providing multi-layer film 34c. Multi-layer film 34c is received by winder portion 32 of system 22, and is wound up on winder shaft/core 50 for storage or subsequent use.

After solidification, the solidified coating is adhered to substrate 34a due at least in part to the increased surface tension of the corona-coated surface of substrate 34a. The resulting multi-layer film 34c has good interlayer adhesion, which reduces the risk of interlayer delamination during use. As such, multi-layer film 34c may be used in a variety of commercial and industrial applications, such as optical reflective films (e.g., reflective polarizing films).

While system 22 is shown in FIG. 2 as a system for coating substrate 34a with a solidifiable coating material, system 22 may alternatively be used with coating materials that are not solidifiable or that do not require a solidification step. In these embodiments, solidification station 30 may be omitted and coated substrate 34b may be wound up on winder shaft/core 50 for storage or subsequent use. For example, where a solidifiable coating material that is solvent-cast may be air-dried or dried in a drying station.

Figure 2A:
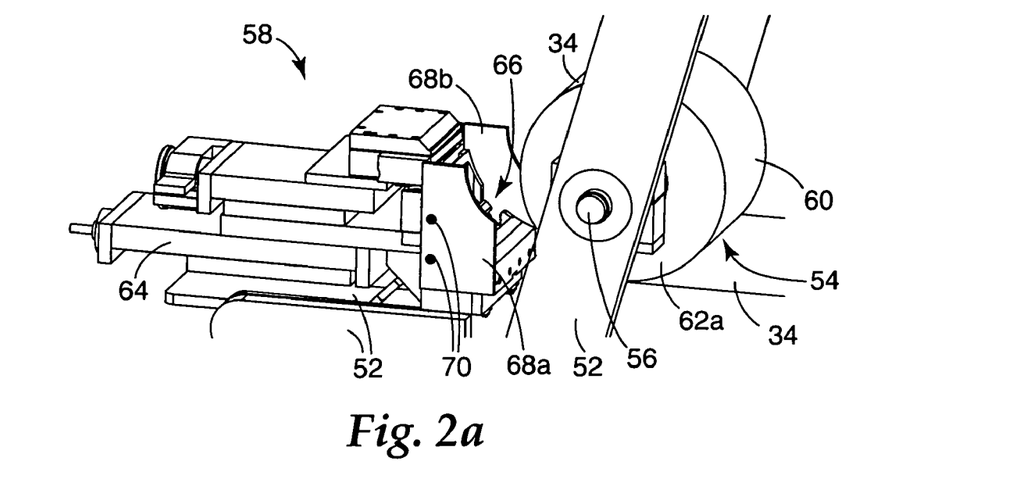
FIG. 2a is an expanded perspective view of a corona-treatment and coating (CTC) assembly of an exemplary system, showing a close-coupled unit of the CTC assembly in a retracted position.

FIG. 2a is an expanded perspective view of CTC assembly 28, which includes frame 52, backup roll 54, shaft 56, and close-coupled unit 58. Backup roll 54 is a backing support that includes annular surface 60 disposed between, and orthogonal to a pair of radial surfaces 62a and 62b (radial surface 62b not shown in FIG. 2a). An example of a suitable roll for backup roll 54 includes an electrically-grounded, hard-chrome-plated, precision ground steel, dead-shaft idler-roll support. The dimensions of backup roll 54 may vary depending on individual processing requirements. An example of suitable dimensions for backing roll 54 includes a diameter of about 25 centimeters and a crossweb width for annular surface 60 of about 17.8 centimeters. Annular surface 60 may also be coated with a thin layer of a ceramic dielectric material (e.g., about 2 millimeters thick), such as ceramic materials commercially available from American Roller, Union Grove, Wis. In some exemplary embodiments, the annular surface may be structured or textured.

Backup roll 54 is rotatably connected to frame 52 via shaft 56, and rotates in a clock-wise direction in the view shown in FIG. 3a. Web 34 extends around annular surface 60 such that substrate 34a is laid onto annular surface 60 at the bottom of backup roll 54 and coated substrate 34b exits from annular surface 60 at the top of backup roll 54. Due to the tension of web 34 throughout system 22, web 34 is held in contact with annular surface 60, which allows annular surface 60 to provide backing support during the corona treatment and the coating process.

Close-coupled unit 58 is the portion of CTC assembly 28 that removes the air boundary layer, corona treats, and coats substrate 34a with a coating material, thereby forming coated substrate 34b. Close-coupled unit 58 includes unit body 64, processing face 66, and lateral shields 68a and 68b, where unit body 64 includes a series of plates that structurally support the components of processing face 66. As discussed below, close-coupled unit 58 is slidably connected to frame 52 (e.g., via pneumatic pistons (not shown)). Thus, close-coupled unit 58 may slide between an open retracted position and a closed extended position relative to backup roll 54. Close-coupled unit 58 is shown in an open retracted position in FIG. 3a, which provides access to processing face 66 for cleaning and adjusting between operations. Processing face 66 is the portion of close-coupled unit 58 where the corona treatment and the coating process occur. Processing face 66 is curved to dimensionally match with annular surface 60 of backup roll 54. As a result, processing face 66 may align with annular surface 60 to define a series of small gaps therebetween when close-coupled unit 58 is in a closed extended position.

Lateral shields 68a and 68b are, for example, plastic (e.g., polycarbonate) or glass, walls secured to unit body 64 via bolts 70, and extend on each side of processing face 66. Lateral shields 68a and 68b are positioned such that the distance between lateral shields 68a and 68b are slightly greater than the crossweb width of annular surface 60. This allows lateral shields 68a and 68b to respectively extend along radial surfaces 62a and 62b when close-coupled unit 58 is in a closed extended position.

Figure 2B:
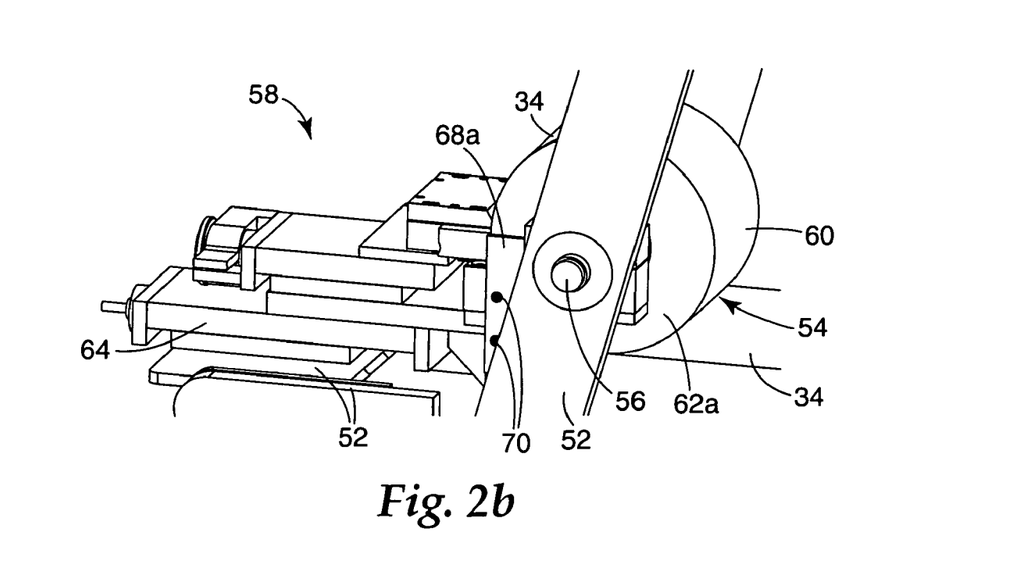
FIG. 2b is an expanded perspective view of the CTC assembly of an exemplary system, showing the close-coupled unit of the CTC assembly in a closed position.

FIG. 2b is an expanded perspective view of CTC assembly 28, in which close-coupled unit 58 is in a closed extended position adjacent backing roll 54. As shown, lateral shield 68a extends along radial surface 62a. The gap between lateral shield 68a and radial surface 62a is desirably small to minimize gas flow therebetween, while also being large enough to prevent contact between lateral shield 68a and radial surface 62a while backup roll 54 rotates. Lateral shield 68b correspondingly extends along radial surface 62b in a similar arrangement.

In the closed extended position, annular surface 60, processing face 66, and lateral shields 68a and 68b define chamber 72, which is a series of small annular gaps through which substrate 34a travels while backup roll 54 rotates. A processing environment may be generated within chamber 72 by introducing one or more gases into chamber 72 via a gas line (not shown in FIG. 2b) located in processing face 66 (shown in FIG. 2a). The introduced gas creates a positive gas pressure within chamber 72 relative to the environment outside of chamber 72. The positive pressure rapidly purges ambient air initially residing within chamber 72, thereby reducing the oxygen concentration of the processing environment within chamber 72.

Examples of suitable gases for the processing environment include nitrogen, helium, nitrogen-in-argon mixtures, helium-in-argon mixtures, xenon-in-helium mixtures, and mixtures thereof. Examples of suitable oxygen concentrations in the processing environment include about 100 parts-per-million (ppm) by volume or less, with particularly suitable oxygen concentrations including about 20 ppm by volume or less. Oxygen concentrations discussed herein may be measured using oxygen and gas analyzers commercially available from Servomex Inc., Sugar Land, Tex.

For example, when nitrogen gas is introduced at a flow rate of about 20 liters/minute into chamber 72 having a volume of about 700 cubic centimeters, the oxygen concentration of the processing environment may be reduced from about 21% by volume (i.e., air) to about 10 ppm by volume in about 30 seconds. This is substantially less time than that required for air evacuations in typical vacuum processes. Thus, the use of positive gas pressures within chamber 72 is beneficial for reducing operation start-up times.

Because openings exist at the upstream entrance and downstream exit of chamber 72, and respectively between lateral shields 68a and 68b and radial surfaces 62a and 62b of backup roll 54, chamber 72 is not sealed from the outside environment. Therefore, the processing environment within chamber 72 is desirably maintained at a positive pressure. The term "positive pressure" refers to a pressure that is greater than a pressure of an environment outside of the processing environment (i.e., outside of chamber 72). For example, if the environment outside of chamber 72 has a pressure of one standard atmosphere, the processing environment is desirably maintained at a pressure that is greater than one standard atmosphere. This prevents air of the outside environment from entering chamber 72. Additionally, the positive pressure of the processing environment is desirably low to prevent blow outs of the coating material, particularly with extrusion coatings. Examples of suitable positive pressures of the processing environment include pressures of about 25-millimeters of water above the outside environment, or less.

The positive pressure of the processing environment may be maintained by continuously introducing gas within chamber 72, where a portion of the gas continuously bleeds into the outside environment. Examples of suitable gas flow rates for a reaction chamber volume of about 700 cubic centimeters include at least about 20 liters/minute. These flow rates are suitable for maintaining oxygen concentrations of about 10 ppm by volume or less for web speeds of web 34 up to about 30 m/min. Once the processing environment is generated within chamber 72, substrate 34a may be continuously fed through chamber 72 for the corona treatment and the coating process.

Figure 3:
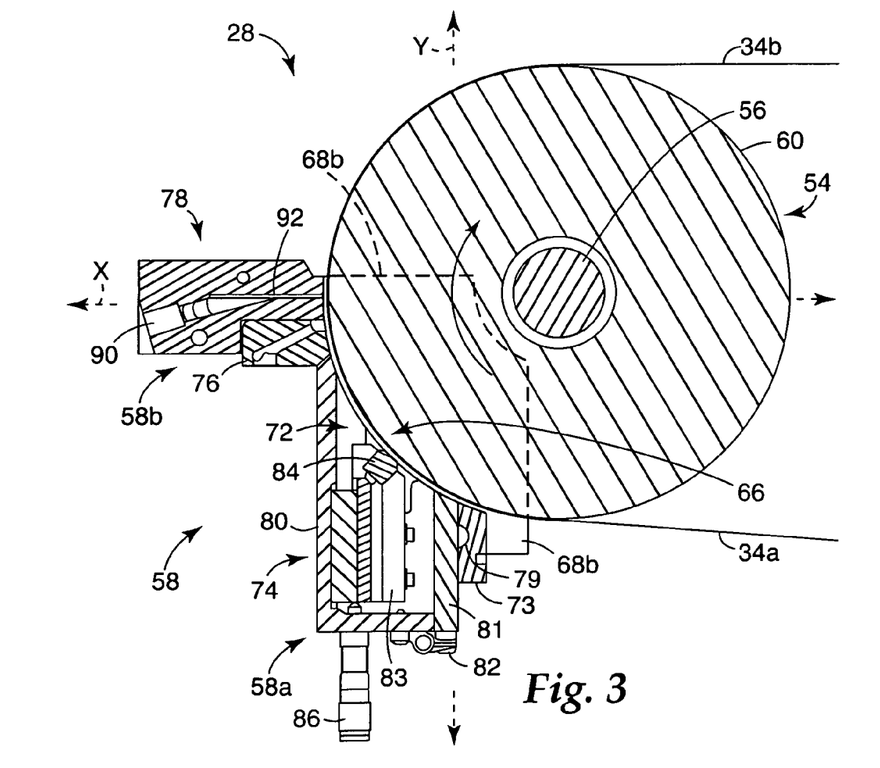
FIG. 3 is a sectional view of the CTC assembly of an exemplary system.

FIG. 3 is a sectional view of CTC assembly 28, which further illustrates close-coupled unit 58 (unit body 64 is omitted for ease of discussion). As shown, close-coupled unit 58 further includes vertical portion 58a and horizontal portion 58b, which are independently slidable relative to each other and to backup roll 54 along an x-axis. As a result, close-coupled unit 58 may be closed adjacent backup roll 54 by simultaneously or independently sliding vertical portion 58a and horizontal portion 58b along the x-axis toward the closed extended position.

Vertical portion 58a includes slot-fed gas knife 73 and electrode portion 74, which are coupled together and extend along a y-axis. Horizontal portion 58b includes vacuum box 76 and coating die 78, which are slidably coupled together along the x-axis. Thus, vacuum box 76 and coating die 78 may also simultaneously or independently slide along the x-axis between the open retracted position and the closed extended position. Accordingly, vertical portion 58a, vacuum box 76, and coating die 78 are each independently slidable along the x-axis relative to each other and backup roll 54.

Figure 4:
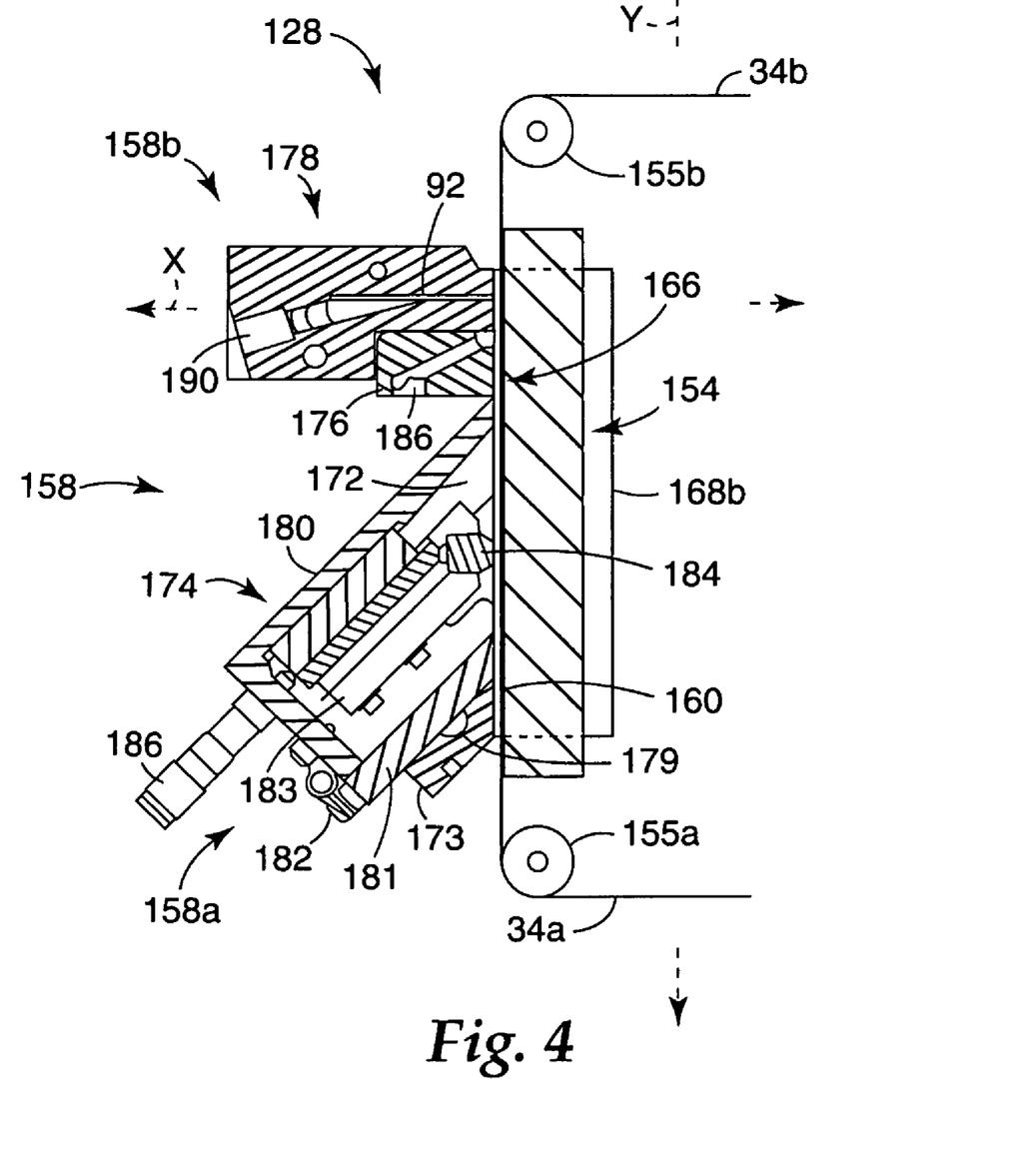
FIG. 4 is a sectional view of an alternative CTC assembly of an exemplary system.

The perpendicular arrangement shown in FIG. 4 allows close-coupled unit 58 to accurately align with backup roll 54 when retracting and closing relative to backup roll 54. When close-coupled unit 58 slides along the x-axis to close adjacent backup roll 54, processing face 66 aligns with annular surface 60 to define chamber 72. Additionally, close-coupled unit 58 only encompasses about a quarter of backup roll 54. Therefore, close-coupled unit 58 is capable of extending and retracting without the aid of cams, hinges, linkages, or other secondary operations that are otherwise required to open an enveloping chamber in preparation for removal.

Slot-fed gas knife 73 is a gas knife jet (e.g., nitrogen knife) that introduces gas of the processing environment across the crossweb width of annular surface 60, via manifold 79 located at the upstream entrance of chamber 72. The gas introduced at the upstream entrance of chamber 72 reduces the amount of ambient air carried in by the motion of substrate 34a.

Electrode portion 74 is used for the corona treatment, and includes chamber wall 80, chamber door 81, door hinge 82, frame 83, corona electrode 84, and electrode gap adjuster 86. Chamber wall 80 is a metal casing that retains frame 83, corona electrode 84, and electrode gap adjuster 86. Chamber door 81 is a metal door that is connected to chamber wall 80 using a hinge at an upstream location from chamber wall 80, via door hinge 82. As such, chamber door 81 may be opened for access within chamber wall 80. When chamber door 81 is closed, chamber wall 80 and chamber door 81 define a portion of chamber 72 where the corona treatment is performed.

Slot-fed gas knife 73 is secured to chamber door 81, and slot-fed gas knife 73, chamber wall 80, and chamber door 81 each have curved faces that preferably match the radius of backup roll 54 to minimize consumption of gas during continuous operation. Additionally, chamber door 81 includes a plurality of holes that connect manifold 79 of slot-fed gas knife 73 to chamber 72 within electrode portion 74. The interconnection distributes a portion of the gas of manifold 79 to within electrode portion 74. This promotes mixing of the gas while backup roll 54 is not rotating, and eliminates the need for a secondary manifold to directly feed gas to electrode portion 74.

Frame 83 includes a ceramic mount, an adapter plate, and precision slide that support corona electrode 84 relative to chamber wall 80. Electrode gap adjuster 86 is attached to chamber wall 80, and frame 83 is retained against electrode gap adjuster 86 by gravity and a spring (not shown). Electrode gap adjuster 86 provides a means for independently adjusting the electrode gap, which is the gap between corona electrode 84 and annular surface 70 of backup roll 54.

Corona electrode 84 desirably extends across the crossweb width of annular surface 60, or at least a useful portion of the crossweb width, to provide an electrical discharge across the desired crossweb width. Corona electrode 84 is connected to a power source (not shown), which provides electrical power to corona electrode 84. During operation, corona electrode 84 creates an electrical discharge that causes the gas molecules of the processing environment to ionize. The extent of the corona treatment generally depends on the electrode gap, the power of the electrical discharge, the gas used for the processing environment, and the web speed of substrate 34a. Suitable electrode gap distances between corona electrode 84 and annular surface 70 range from about 0.25 millimeters (mm) to about 3.0 mm. A suitable discharge level includes about 2.0 joules/centimeter$^2$, which corresponds to a corona power of about 210 watts and a web speed of about 6.3 m/min. The active gaseous species react with, and covalently bond to, the surface of substrate 34a, thereby increasing surface tension and reactivity of substrate 34a. This correspondingly increases the adhesive properties of substrate 34a.

Additionally, the increased surface tension also enhances the wettability of the surface of substrate 34a and increases the stability of the dynamic wetting line that marks the boundary between an upstream coating bead meniscus and substrate 34a. This increases the size of the "coating window", allowing for a broader range of process settings that produce coatings without unacceptable coating defects. Increased surface tension of substrate 34a also decreases the likelihood of film rupture of a coating as it shrinks during consolidation. Accordingly, electrode portion 74 provides a continuous in-line corona treatment to substrate 34a as substrate 34a travels through chamber 72.

Vacuum box 76 is disposed downstream from electrode portion 74, and creates a pressure differential for coating the solidifiable material from coating die 78. Vacuum box 76 is separated from annular surface 60 by a vacuum box gap that is adjustable by sliding vacuum box 76 along the x-axis.

Coating die 78 is a slot-fed knife die slidably secured to vacuum box 76, and includes feed coupling 90 and die cavity 92. Feed coupling 90 is a coupling location for connecting coating die 78 to a feed line of the coating material, which is fed by a feed system that heats and pre-meters the flow of the coating material. Die cavity 92 includes a metering slot and distribution manifold that provide a pathway between feed coupling 90 and the corona-treated surface of substrate 34a.

The coating thickness of the solidifiable material depends on several factors, such as the flow rate, web speed, and the width of die cavity 92. Suitable wet coating thicknesses of the solidifiable material range from about 10 micrometers to about 125 micrometers, with particularly suitable wet coating thicknesses ranging from about 10 micrometers to about 50 micrometers, and with even more particularly suitable wet coating thicknesses ranging from about 15 micrometers to about 35 micrometers.

Coating die 78 is separated from annular surface 60 by a die gap. In one embodiment, coating die 78 may have an upstream die gap that is greater a downstream die gap. The upstream die gap of coating die 78 refers to a gap between coating die 78 and annular surface 60 that is upstream of die cavity 92. Correspondingly, the downstream die gap of coating die 78 refers to a gap that is downstream of die cavity 92. This difference in die gaps should be chosen to stabilize the upstream coating bead against positive back pressure and fluctuating pressures within chamber 72. Suitable offsets of the upstream die gap relative to the downstream die gap of coating die 78 range from about 100 micrometers to about 150 micrometers.

While coating die 78 is described herein as a slot-fed knife die, coating material may alternatively be applied in a variety of coating devices that maintain a small gap between the coater and the substrate, such as extrusion coaters, ablation coaters, laminators, knife over roll coaters, blade coaters, roll coaters, and combinations thereof.

As further shown in FIG. 3, coating die 78 is positioned downstream from corona electrode 84. As such, after the corona treatment, substrate 34a travels along a circumferential path and is coated with the coating material by coating die 78. The duration between the corona treatment and the coating process depends on circumferential distance between corona electrode 84 and coating die 78 and the web speed of substrate 34a. Examples of suitable circumferential distances between corona electrode 84 and coating die 78 range from about 2 centimeters to about 20 centimeters, with particularly suitable distances ranging from about 4 centimeters to about 10 centimeters. Such distances minimize the duration between corona treatment and coating, thereby further preserving the surface properties of substrate 34a. Suitable durations between corona treatment and coating include 10 seconds or less, with particularly suitable durations including one second or less.

During operation, substrate 34a is wound around annular surface 60 and close-coupled unit 58 is extended to close adjacent backup roll 54. The extension of close-coupled unit 58 may be accomplished in a variety of manners to obtain a desired electrode gap, vacuum box gap, and die gap. An example of a suitable technique for extending close-coupled unit 58 includes initially sliding, simultaneously or independently, vertical portion 58a, vacuum box 76, and coating die 78 toward backup roll 54. The vacuum box gap and the position of vertical component 58a are then independently adjusted. The positioning of vertical component 58a provides an initial gap between annular surface 60 and slot-fed gas knife 73/electrode portion 74. The electrode gap is then adjusted with electrode gap adjuster 86. After the electrode gap is set, coating die 78 is adjusted to obtain the desired die gap of coating die 78. The series of gaps of chamber 72 may be further adjusted as necessary to attain the desired corona treatment and coating properties. For example, the die gap of coating die 78 may be adjusted upon coat-in to optimize the coating quality.

Because substrate 34a is retained within the processing environment of chamber 72 during the corona treatment, during the coating process, and during the transit between the corona treatment and the coating process, the risk of oxygen exposure to the corona-treated surface is reduced. Additionally, because electrode portion 74 and coating die 78 are closely coupled to each other along the circumferential path of substrate 34a, the duration between the corona treatment and the coating process is small, thereby further reducing the risk of oxygen exposure.

FIG. 4 is a sectional view of CTC assembly 128, which is a planar alternative to CTC assembly 28, discussed above in FIG. 3. As shown in FIG. 4, CTC assembly 128 includes planar support 154, rollers 155a and 155b, and close-coupled unit 158. Planar support 154 includes planar surface 160, which supports substrate 34a in a similar manner to annular surface 60 of backup roll 54, except that planar surface 160 is a generally flat backing support. Substrate 34a is wound onto planar support 154 via rollers 155a and 155b.

Close-coupled unit 158 includes lower portion 158a and upper portion 158b, which are similar to vertical portion 58a and horizontal portion 58b of close-coupled unit 58 and the corresponding components are identified with references labels increased by "100". In this embodiment, processing face 166 of close-coupled unit 158 is planar rather than annular, thereby matching the planar dimensions of planar surface 160.

CTC assembly 128 functions in a similar manner to CTC assembly 28. Lower portion 158a and upper portion 158b are closed adjacent planar support 154 gas is introduced through manifold 179 to generate a processing environment within chamber 172. As substrate 34a passes through chamber 172, substrate 34a is corona treated by corona electrode 184 and coated by coating die 78. The resulting coated substrate 34b then exits close-coupled unit 158. CTC assembly 128 provides an example of an alterative arrangement for corona treating and coating substrate 34a while within a processing environment. Accordingly, system 22 may incorporate CTC assemblies having a variety of similar designs to reduce the oxygen exposure to the corona-treated surface of substrate 34a. For example, lower portion 158a and upper portion 158b may both extend along the x-axis, which provides for a more compact design compared to that shown in FIG. 4.

Figure 5:
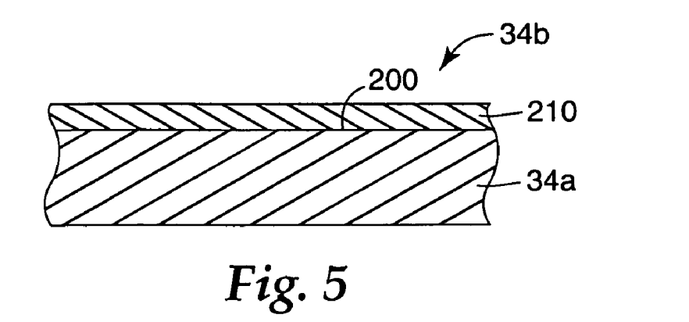
FIG. 5 is a sectional view of section 5 taken in FIG. 2, showing a coating disposed on a substrate.

FIG. 5 is an expanded sectional view of section 5 taken in FIG. 1, illustrating the layers of coated substrate 34b after the corona treatment and coating process. As shown in FIG. 5, coated substrate 34b includes substrate 34a (having corona-treated surface 200) and coating 202, where coating 202 is disposed on corona-treated surface 200. As discussed above, substrate 34a is a film that is suitable for corona-treatment processes. Examples of suitable materials for substrate 34a include polymers, metal layers or foils, foils with polymer layers, polymer fabrics, ceramic fabrics, glassy woven fabrics, non-woven fabrics, papers, papers with polymer layers, and laminated combinations thereof.

Examples of suitable polymer materials for substrate 34a include cyclic olefin copolymers, polyethylenes, polypropylenes, polybutylenes, polyhexenes, polyoctenes, polyisobutylenes, ethylene vinyl acetates, polyesters (e.g., polyethylene terephthalate, polyethylene butyrate, and polyethylene napthalate), polyamides (e.g., polyhexamethylene adipamide), polyimides, polyurethanes, copolymers thereof, and combinations thereof.

Examples of particularly suitable polymer materials for substrate 34a include cyclic olefin copolymers, such as norbornene-based cyclic olefin copolymers. Norbornene-based cyclic olefin copolymers are optically transparent, clear, have good light stability, have low birefringence, and are dimensionally stable. Examples of suitable optical uses for norbornene-based cyclic olefin copolymers are discussed in U.S. patent application Ser. No. 10/976,675, entitled "Optical Films Incorporating Cyclic Olefin Copolymers".

Norbornene-based cyclic olefin copolymers are copolymers of norbornene-based monomers and olefins. Examples of suitable norbornene-based monomers include norbornene, 2-norbornene, 5-methyl-2-norbornene, 5,5-dimethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, and 5-phenyl-2-norbornene, derivatives thereof, and combinations thereof. Examples of suitable norbornene derivatives include alkyl, alkylidene, aromatic, halogen, hydroxy, ester, alkoxy, cyano, amide, imide, silyl-substituted derivatives, and combinations thereof. Examples of suitable olefins of the copolymer include ethylene, propylene, and combinations thereof.

Coating 202 compositionally includes a coating material that is adhered on corona-treated surface 200 of substrate 34a. Examples of suitable coating materials for coating 202 include solidifiable and non-solidifiable materials. In embodiments incorporating solidifiable materials, the solidifiable materials are in substantially non-solidified states at this point (i.e., prior to solidification). As discussed above, the solidifiable material used generally corresponds to the type of apparatus used for solidification station 30 of system 22. Examples of suitable solidifiable materials for coating 202 include curable materials (e.g. photocurable, chemically curable, and thermosettable materials), thermoplastic materials, solvent-borne materials, and combinations thereof.

In embodiments involving curable materials, the curable materials include one or more functional molecules (e.g., monomers, oligomers, polymers, and combinations thereof), and one or more polymerization initiators (e.g., photoinitiators, chemical initiators, and thermal initiators). Examples of suitable functional molecules of the curable materials include phenolic resins, bismaleimide binders, vinyl ether resins, aminoplast resins having pendant alpha, beta unsaturated carbonyl groups, urethane resins, epoxy resins, acrylate resins, acrylated isocyanurate resins, urea-formaldehyde resins, isocyanurate resins, acrylated urethane resins, acrylated epoxy resins, and combinations thereof.

Examples of suitable acrylate resins include methyl(meth)acrylates, ethyl (meth)acrylates, styrenes, divinylbenzenes, hydroxyethyl(meth)acrylates, hydroxypropyl (meth)acrylates, hydroxybutyl(meth)acrylates, 2-hydroxy-3-phenoxypropyl (meth)acrylates, lauryl(meth)acrylates, octyl(meth)acrylates, caprolactone (meth)acrylates, tetrahydrofurfuryl (meth)acrylates, cyclohexyl(meth)acrylates, stearyl (meth)acrylates, 2-phenoxyethyl(meth)acrylates, isooctyl(meth)acrylates, isobornyl (meth)acrylates, isodecyl(meth)acrylates, polyethylene glycol mono(meth)acrylates, polypropylene glycol mono(meth)acrylates, vinyl toluenes, ethylene glycol di(meth)acrylates, polyethylene glycol di(meth)acrylates, ethylene glycol di(meth)(meth)acrylates, hexanediol di(meth)acrylates, triethylene glycol di(meth)acrylates, 2-(2-ethoxyethoxy)ethyl(meth)acrylates, propoxylated trimethylol propane tri(meth)acrylates, trimethylolpropane tri(meth)acrylates, glycerol tri(meth)acrylates, pentaerthyitol tri(meth)acrylates, pentaerythritol tetra(meth)acrylates, and combinations thereof. The term "(meth)acrylate" includes both acrylates and methacrylates.

Examples of suitable polymerization initiators in the curable materials include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, salts of onium cations (e.g., arylsulfonium salts), organometallic salts (e.g., ion arene systems), and combinations thereof. Examples of suitable commercially available ultraviolet-activated and visible light-activated photoinitiators include the trade designated "IRGACURE" and "DAROCUR" initiators from Ciba Specialty Chemicals, Tarrytown, N.Y.; and "LUCIRIN" from BASF, Charlotte, N.C. Suitable concentrations of the polymerization initiator in the solidifiable material range from about 0.01% by weight to about 10% by weight.

In embodiments involving thermoplastic materials or solvent-borne materials, examples of suitable materials include polyesters, polyamides, polyimides, polyether sulfones, polysulfones, polypropylenes, polyethylenes, polymethyl pentenes, polyvinyl chlorides, polyvinyl acetals, polycarbonates, polyurethanes, and combinations thereof. In embodiments involving solvent-borne materials, the materials may reside in a solvent as a full or partial solution, dispersion, emulsion, or flocculation.

In embodiments in which the coating material of coating 202 is not a curable material, suitable materials include liquid coatings that are applied and remain in a liquid state as an inherent feature of their functionality that aids subsequent processing or final use. Such materials may be solidified by solvent removal and/or drying.

The coating materials of coating 202 may also include additional components, such as wetting agents, catalysts, activators, cross-linking agents, photostabilizers, antioxidants, UV-absorbers, near-infrared absorbers, plasticizers, surfactants, dyes, colorants, pigments, rheological modifiers, fillers, coagulants, co-solvents, drying agents, and combinations thereof.

Figure 6:
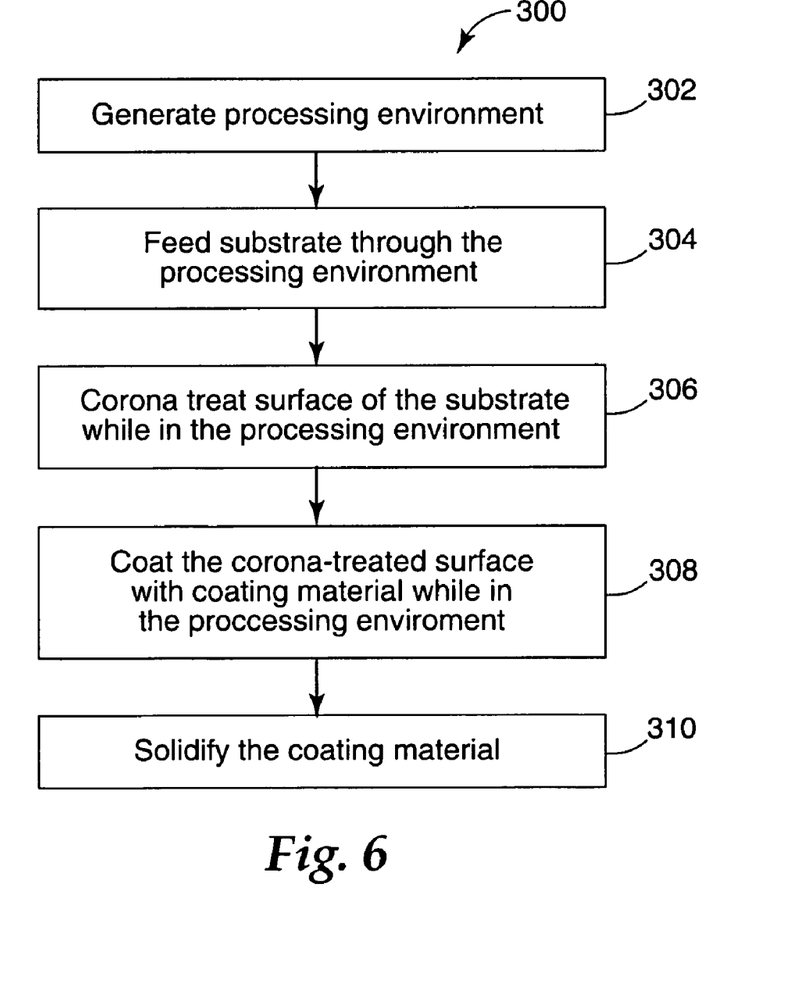
FIG. 6 is a flow chart of a method of the present invention for forming multi-layer films.

FIG. 6 is a flow chart of method 300 for forming multi-layer films using system 22 of the present invention. Method 300 includes steps 302-310, and initially involves generating a processing environment in chamber 72 that has a positive pressure and a low oxygen ($O_2$) concentration, or is free of oxygen (step 302). The processing environment may be generated by introducing a gas into chamber 72 at a sufficient flow rate to provide a positive pressure.

Substrate 34a is then fed into the processing environment of chamber 72 (step 304) and is corona treated (step 306) by corona electrode 84 while within the processing environment. During the corona treatment, the gas of the processing environment adjacent substrate 34a is subjected to an electrical discharge (i.e., a corona discharge). This causes portions of the gas molecules of the processing environment to become ionized and further causes other gas molecules to become free radicals. These gaseous species then react with, and covalently bond to, surface 200 of substrate 34a. This increases the surface tension and reactivity of substrate 34a, thereby increasing the adhesive properties and wettability of the surface.

The corona-treated surface of substrate 34a is then coated with a coating material via coating die 78 while within the processing environment (step 308). As discussed above, because substrate 34a remains within the processing environment between the corona treatment and the coating process, the corona-treated surface of substrate 34a is not exposed to gases having high oxygen concentrations (e.g., air). This substantially prevents oxygen from contacting the corona-treated surface, thereby preserving the adhesive properties obtained from the corona treatment.

If the coating material is solidifiable, the coating material may be then solidified at solidification station 30 using a suitable solidification technique (step 310). As discussed above, the solidification technique used is generally dependent on the chemistry of the coating material. For example, a suitable solidification technique for a photocurable material includes exposing the material to radiation of an appropriate wavelength (e.g., ultraviolet light, visible light, and electron beam). Similarly, a suitable solidification technique for a thermosetting material includes exposure to a sufficient temperature and duration to initiate thermal curing. A suitable solidification technique for a thermoplastic material includes cooling the material below the solidification temperature of the material. A suitable solidification technique for a solvent-borne material includes heating the material to evaporate the solvent, thereby leaving the non-volatile material adhered to the polymer film. Additionally, a combination of solidification techniques may be used, based on the chemistry of the coating material.

After solidification, the solidified coating is adhered to substrate 34a due at least in part to the increased surface tension of the corona-coated surface of substrate 34a. The resulting multi-layer film 34c has good interlayer adhesion, which reduces the risk of interlayer delamination during use. As such, multi-layer film 34c may be used in a variety of commercial and industrial applications, such as optical reflective and films.

EXAMPLES

The present invention is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Adhesion Testing

Multi-layer films of Examples 1-4 and Comparative Examples A and B were prepared pursuant to the following procedure. A coating system corresponding to system 22, shown above in FIGS. 2-4, was used, which included an unwinder portion, a CTC assembly, an ultraviolet-curing station, and a winder portion. The coating assembly included a hard chromed steel backup roll having a 254-millimeter diameter and a crossweb width of 17.8 centimeters. Gas was introduced into the reaction chamber at a flow rate of 20 liters/minute to generate a processing environment. Table 1, shown below, provides the particular gas used for each multi-layer film. A norbornene-based cyclic olefin copolymer film was fed through the reaction chamber at a web speed of 6.3 m/min. The norbornene-based cyclic olefin copolymer was commercially available under the trade designation "TOPAS 6013" from Topas Advanced Polymers, Florence, Ky.

The corona electrode had a crossweb width of 10 centimeters, an electrode gap of 1.5 millimeters, and was located about four centimeters upstream of the slot-fed knife die. The corona electrode was provided a corona power of 210 watts, which generated a normalized corona energy of 2.0 joules/ centimeter$^2$ for a web speed of 6.3 m/min. As the substrate traveled by the corona electrode, the electrical discharge ionized gas atoms, causing the gas atoms to bond to the surface of the substrate, thereby forming a corona-treated surface.

After the corona treatment, the substrate was coated with a solidifiable material while within the processing environment. Due to the web speed and the 8-centimeter circumferential distance between the corona electrode and the coating die, a delay of less than 0.5 seconds occurred between the corona treatment and the coating process.

The coating was performed using a slot-fed knife die against a precision coating roll (which had a total indicated runout/reading (TIR) of less than 2.5 micrometers). The die face was machined to match the radius of the backing roll. The downstream gap of the coating die was set to achieve a visually attractive coating at a wet layer thickness ranging from 10-20 micrometers. The upstream gap of the coating die was about 125 micrometers greater than the downstream gap. Additionally, a shim height of 125 micrometers was used to obtain acceptable crossweb uniformity. The extruded solidifiable material was an ultraviolet-curable acrylate resin which was supplied to the coating die using a peristaltic pump with a 3.2 millimeter-bore tubing. The coating die body was heated such that the resin temperature was about 54° C. (about 130° F.) at application. Coating material was supplied using a Watson-Marlowe 505u peristaltic pump fitted with a 4.8-millimeter bore, double-Y tubing plumbed to the die with water-jacketed ¼-inch polyflo and fed from an air-pressurized, heated reservoir. Both the solution reservoir and the supply lines were continuously heated to match the die body temperature. The resin was coated at a thickness of about 15 micrometers.

The ultraviolet-curable acrylate resin included 30.0% by weight brominated epoxy diacrylate (commercially available under the trade designation "RDX 51027" from by UCB Radcure Inc., Smyrna, Ga.), 20.0% by weight hexafunctional aromatic urethane acrylate oligomer (commercially available under the trade designation "EB 220" from by UCB Radcure Inc.), 37.5% by weight 2-(2,4,6-tribromophenyl)-1-ethanol acrylic ester, (commercially available under the trade designation "BR-31" (CAS #7347-19-5) from Dai-Ichi Kogyo Seiyaka Co., Japan), 12.5% by weight 2-phenoxyethyl acrylate (commercially available under the trade designation "PHOTOMER 4035" from Henkel Corp., Ambler, Pa.), 0.3 parts-per-hundred (pph) of a fluorosurfactant (commercially available under the trade designation "FC-430" from 3M Company, St. Paul, Minn.), 1.0 pph of a first photoinitiator (commercially available under the trade designation "DORACURE 1173" from Ciba Geigy, Tarrytown, N.Y.), and 1.0 pph of a second photoinitiator (commercially available under the trade designation "LUCIRIN TPO" from BASF, Charlotte, N.C.).

The coated resin was cured open faced under a nitrogen atmosphere with an oxygen concentration of about 2-5 ppm. The curing was performed with a trade designated "F450" D-bulb ultraviolet curing system from Fusion UV Systems, Inc., Gaithersburg, Md. with a Cold/R500 dichroic reflector at 100% power. At the target web speed of 6.3 m/min, the curing system delivered ultraviolet energy at a dose of 1.3 joules/centimeter$^2$ in the UVA wavelength range (i.e., from about 315 nanometers to about 400 nanometers). Curing occurred while the substrate was in intimate contact with a water-cooled back plate, which was held at about 45° C. (about 115° F.) to about 54° C. (about 130° F.). The resulting multi-layer films of Examples 1-4 and Comparative Examples A and B contained cured acrylate coatings disposed on corona-treated surfaces of the substrates.

The multi-layer films of Examples 5 and 6 were formed in the same manner as discussed above for Examples 1-4, except that a delay of five minutes occurred between the corona treatment and the coating process. The multi-layer film of Comparative Example C was not corona treated, and the acrylate resin was directly coated onto the substrate.

The multi-layer films of Examples 1-6 and Comparative Examples A-C were each measured for interlayer adhesion strengths pursuant to ASTM D3359-02 using a high-tack, rubber-resin, pressure-sensitive adhesive tape with a cellophane backing (3M #610 Tape from 3M Company, St. Paul, Minn.). The adhesive strengths were qualitatively measured by visual observation and ranked on a scale of 0B-5B, where 0B corresponded to no interlayer adhesion and 5B corresponded to excellent interlayer adhesion.

Additionally, the multi-layer films of Examples 1-6 and Comparative Examples A-C were each measured pursuant to a "tape-snap" test. The "tape-snap" test involved adhering a length of tape over a cut edge of the given multi-layer film. The tape was a silicone pressure-sensitive adhesive having a polyethylene terephthalate backing (3M #8403 Tape from 3M Company, St. Paul, Minn.). The tape was rubbed in place to assure good adhesion, particularly along the cut edge of the multi-layer film. The tape was then rapidly pulled back at a peel angle of about 180°. The adhesive strengths were then qualitatively measured by visual observation.

Table 1 provides the results of ASTM D3359-02 and the tape-snap test for the multi-layer films of Examples 1-6 and Comparative Examples A-C.

TABLE 1

| Example | Gas of Processing Environment | Delay between Corona Treatment and Coating Process | ASTM D3359-02 | Tape-Snap Test |
|---|---|---|---|---|
| Example 1 | Nitrogen | <0.5 seconds | 5B | Excellent |
| Example 2 | Helium | <0.5 seconds | 5B | Excellent |
| Example 3 | 2% Helium-in-Argon | <0.5 seconds | 4B | Excellent |
| Example 4 | 2% Nitrogen-in-Argon | <0.5 seconds | 5B | Excellent |
| Example 5 | Nitrogen | 5 minutes | 5B | Excellent |
| Example 6 | Helium | 5 minutes | 1B | Excellent |
| Comparative Example A | Air | <0.5 seconds | 0B-1B | Fail |
| Comparative Example B | Argon | <0.5 seconds | 0B | Fail |
| Comparative Example C | None | N/A | 0B | Fail |

The data in Table 1 illustrate the improved interlayer adhesion that is obtained with the method and system of the present disclosure. In comparing the multi-layer films of Examples 1-6 to the multi-layer film of Comparative Example C, it is shown that the corona treatment substantially increases the interlayer adhesion between the polymer film and the coated material. Additionally, a comparison of the multi-layer films of Examples 1-6 to the multi-layer film of Comparative Example A shows that corona treating and coating the polymer film in a processing environment having a low oxygen concentration also substantially increases the interlayer adhesion.

Those of ordinary skill in the art will readily appreciate that the ratings "Excellent" and "Fail" are only applicable to some exemplary embodiments and should be used as a guideline and not a rigid test of what is within the scope of the present disclosure. For instance, despite the fact that argon coronas did not give good adhesion in Comparative Example B, it might be beneficial for other applications, (e.g., for the treatment of films other than Topas COC). Accordingly, multi-layer films formed with the use of the method and system of the present disclosure have good interlayer adhesion for use in a variety of commercial and industrial applications.

Air Purging Testing

Air purging tests were performed using the system discussed above for the adhesion testing of Examples 1-4. When the close-coupled unit was closed adjacent the backup roll, the reaction chamber had a volume of about 700 cubic centimeters. Nitrogen was introduced into the reaction chamber at a flow rate of about 20 liters/minute to purge the air from the reaction chamber. The oxygen concentration of the processing environment was reduced from about 21% by volume (i.e., air) to less than 100 ppm by volume within 11-16 seconds. Additionally, the concentrations of oxygen in the processing environment were then maintained at less than 10 ppm by volume using continuous nitrogen flow rates of about 18 liters/minute.

In comparison, it is believed that current nitrogen corona hardware in the art requires about 10 times longer to purge air to obtain an oxygen concentration of less than 100 ppm by volume, and flow rates of more than 300 liters/minute to maintain processing environments having oxygen concentrations less than 20 ppm by volume. Thus, the coating assembly used in the method and system of the present disclosure is efficient for substantially reducing operation time and costs.

Although the present disclosure has been described with reference to preferred embodiments, workers skilled in the art will recognize that changes may be made in form and detail without departing from the spirit and scope of the invention.

The invention claimed is:

1. A system for forming a multi-layer film, the system comprising:
 a backing support having a surface; and
 a close-coupled unit configured to be disposed adjacent the surface of the backing support, the close-coupled unit comprising:
  a corona electrode;
  a coating die disposed at a downstream location along the surface from the corona electrode; and
  a slot-fed gas knife disposed at an upstream location along the surface from the corona electrode.

2. The system of claim 1, wherein the close-coupled unit is movable relative to the backing support.

3. The system of claim 1, wherein the coating die is disposed at about 10 centimeters or less downstream from the corona electrode.

4. The system of claim 3, wherein the coating die is disposed at about 4 centimeters or less downstream from the corona electrode.

5. The system of claim 1, wherein the close-coupled unit further comprises a pair of lateral shields configured to extend beyond the surface of the backing support when the close-coupled unit is disposed adjacent the backing support.

6. The system of claim 1, wherein the close-coupled unit further comprises a vacuum box disposed at an upstream location along the surface from the coating die.

7. The system of claim 1, further comprising a solidification station configured to solidify material extruded from the coating die.

8. The system of claim 1, wherein the corona electrode and the coating die are independently adjustable relative to the surface of the backing support.

9. The system of claim 1, wherein the surface of the backing support is an annular surface, and wherein the corona electrode and the coating die at least partially define a processing face having a curved surface that substantially matches the dimensions of the annular surface of the backing support.

10. The system of claim 1, wherein the corona electrode and the coating die are disposed in a chamber that is configured for corona treating and coating in a process environment.

11. A system for forming a multi-layer film, the system comprising:
 a backing support configured to support a substrate;
 a corona electrode configured to corona treat the substrate on the backing support while the substrate is in a processing environment, thereby forming a corona-treated surface;
 a coating die configured to coat a coating material on the corona-treated surface of the substrate on the backing support while the substrate remains in the processing environment, wherein the coating die is disposed at about 10 centimeters or less downstream from the corona electrode; and
 a slot-fed gas knife disposed at an upstream location from the corona electrode along the backing support.

12. The system of claim 11, wherein the coating die is disposed at about 4 centimeters or less downstream from the corona electrode.

13. The system of claim 11, wherein the backing support comprises an annular surface, and wherein the corona electrode and the coating die at least partially define a processing face having a curved surface that substantially matches the dimensions of the annular surface of the backing support.

14. The system of claim 11, wherein the backing support, the corona electrode, and the coating die at least partially define a chamber, wherein a processing environment within the chamber has a positive pressure and an oxygen concentration of about 100 parts-per-million by volume or less.

15. The system of claim 11, further comprising a solidification station configured to solidify the solidifiable material.

* * * * *

UNITED STATES PATENT AND TRADEMARK OFFICE
CERTIFICATE OF CORRECTION

PATENT NO. : 7,707,963 B2
APPLICATION NO. : 11/394868
DATED : May 4, 2010
INVENTOR(S) : Scott L Ciliske Page 1 of 1

It is certified that error appears in the above-identified patent and that said Letters Patent is hereby corrected as shown below:

<u>Column 3</u>
Line 53; Delete "I" and insert -- 1 --, therefor.

<u>Column 10</u>
Line 61; Delete "pentaerthyitol" and insert -- pentaerythritol --, therefor.

Signed and Sealed this
Twelfth Day of February, 2013

Teresa Stanek Rea
*Acting Director of the United States Patent and Trademark Office*